United States Patent [19]

Gove et al.

[11] Patent Number: 5,729,245
[45] Date of Patent: Mar. 17, 1998

[54] ALIGNMENT FOR DISPLAY HAVING MULTIPLE SPATIAL LIGHT MODULATORS

[75] Inventors: Robert J. Gove; Richard C. Meyer, both of Plano; Stephen W. Marshall, Richardson; Gary L. Sextro, McKinney, all of Tex.

[73] Assignee: Texas Instruments Incorporated, Dallas, Tex.

[21] Appl. No.: 403,532

[22] Filed: Mar. 14, 1995

Related U.S. Application Data

[63] Continuation of Ser. No. 216,193, Mar. 21, 1994, abandoned.
[51] Int. Cl.⁶ ........................................ G09G 3/34
[52] U.S. Cl. ............................... 345/84; 348/755
[58] Field of Search .................... 345/88, 100, 98, 345/84, 190, 185, 4, 5, 6, 54; 348/806, 189, 190, 745, 755, 770, 771; 359/53; 349/33

[56] References Cited

U.S. PATENT DOCUMENTS

| | | | |
|---|---|---|---|
| 3,938,134 | 2/1976 | Hackstein | 345/4 |
| 4,035,841 | 7/1977 | Micek | 348/806 |
| 4,847,809 | 7/1989 | Suzuki | 345/190 |
| 4,878,194 | 10/1989 | Nakatsugawa | 345/190 |
| 5,051,739 | 9/1991 | Hayashida | 345/98 |
| 5,113,272 | 5/1992 | Reamey | 345/4 |
| 5,299,039 | 3/1994 | Bohannon | 359/53 |
| 5,300,944 | 4/1994 | Shapiro | 345/88 |

*Primary Examiner*—Xiao Wu
*Attorney, Agent, or Firm*—Julie L. Reed; James C. Kesterson; Richard L. Donaldson

[57] ABSTRACT

A method and structure for a display system having multiple spatial light modulators (SLMs) (16), each of which contributes an image of one color that is perceived by the viewer as a combined image. The SLMs (16) have more rows and columns of pixel elements (42) than rows or columns of pixel data to be displayed. A window of "active" pixel elements (42) can be shifted up and down or right and left by selecting which pixel elements (42) are to receive data. The addressing circuit (31, 31a, 35, 35a) of each SLM 16 can be controlled so as to accomplish this shifting.

12 Claims, 3 Drawing Sheets

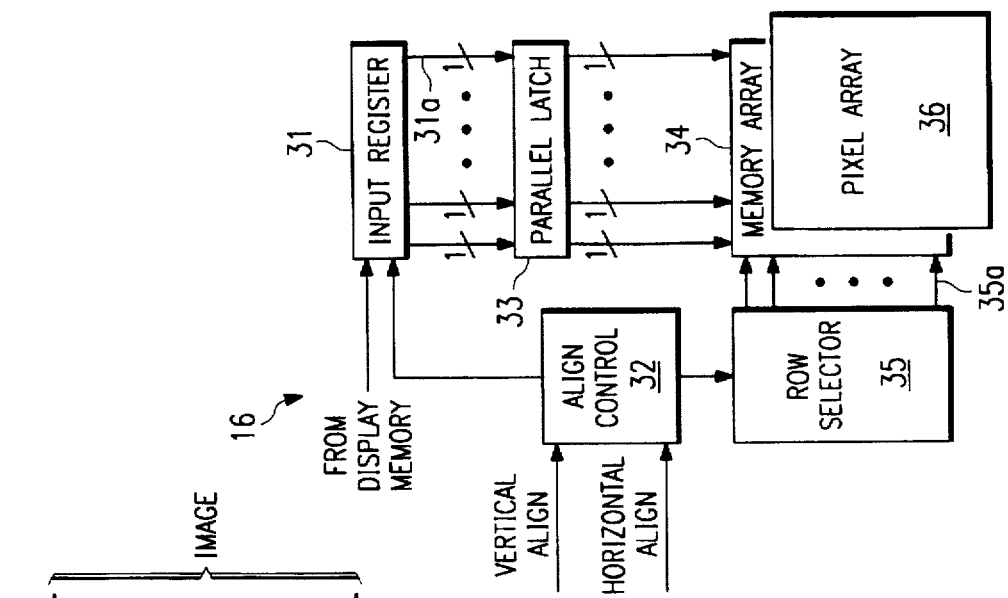
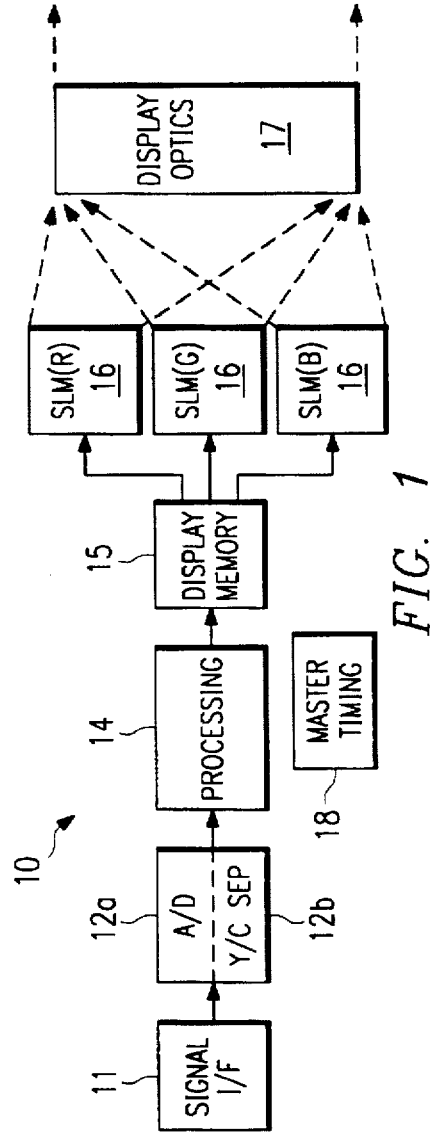
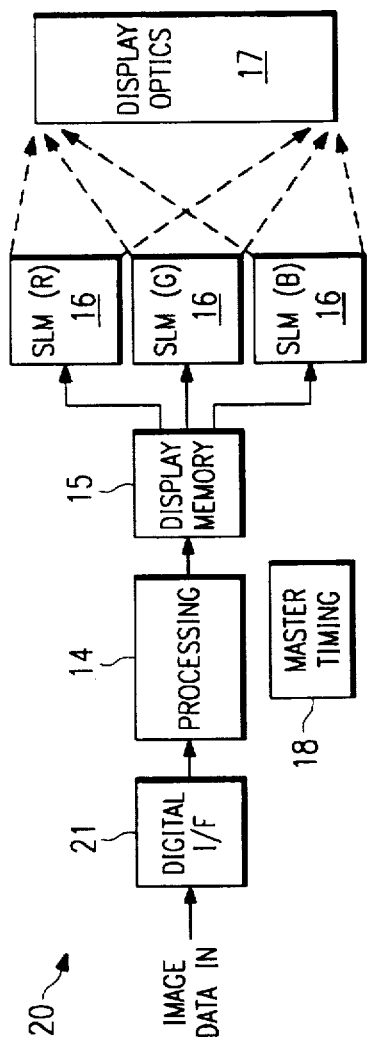

ALIGNMENT FOR DISPLAY HAVING MULTIPLE SPATIAL LIGHT MODULATORS

This application is a Continuation of application Ser. No. 08/216,193 filed Mar. 21, 1994, which is now abandoned.

TECHNICAL FIELD OF THE INVENTION

This invention relates to image display systems, and more particularly to systems that provide color images by means of multiple spatial light modulators.

BACKGROUND OF THE INVENTION

Real-time display systems based on spatial light modulators (SLMs) are increasingly being used as an alternative to display systems using cathode ray tubes (CRTs). SLM systems provide high resolution displays without the bulk and power consumption of a CRT system.

Digital micromirror devices (DMDs) are a type of SLM, and may be used in projection display applications. A DMD has an array of micro-mechanical mirror elements, each individually addressable by electronic data. Depending on the state of its addressing signal, each mirror element tilts so that it either does or does not reflect light to the image plane. Other SLMs operate on similar principles, with pixel elements that emit or reflect light simultaneously with other pixel elements, such that a complete image frame is generated by addressing pixel elements rather than by scanning them.

For processing data in an SLM-based system, as is the case with other digital image processing systems, the processor operates on pixel data. Interlaced data is arranged pixel-by-pixel, row-by-row, and field-by-field. Scan conversion techniques are used to generate frames from fields. Non-interlaced data is already arranged as frames. Processing tasks such as colorspace conversion and scaling, as well as scan conversion, are performed on the pixel data.

However, in an SLM-based system, the SLM must receive the data in "bit-planes". In other words, pixel data must be reformatted into bit-level data so that each pixel element can be "on" or "off" a length of time corresponding to the value of its pixel data. Various modulation schemes determine how long each pixel is on or off, and permit greyscale and color images to be displayed. A bit-plane represents all bits of all pixels having the same digital weight. For pixels having an n-bit resolution, there are n bit-planes per display frame. SLM-based systems use a display memory to provide these bit-planes of data to the SLM.

For providing color images, there are at least two approaches. A "sequential color" approach uses a color wheel that is synchronized to the pixel data so that as the data representing a particular color, i.e., red, green, or blue, is used by the SLM to generate an image, a corresponding color filter colors the light from the SLM. The images for the different colors are displayed sufficiently fast so that the viewer perceives the desired color. A "parallel color" approach uses a different SLM to provide each color. The images from each SLM are combined so that the viewer perceives the desired color.

As an example of implementation of the parallel approach, a display system might have three SLMs, one for red, one for green, and one for blue. A problem with this implementation is that the SLMs must be aligned so that the light from the three pixel elements having data for the same pixel appears at the same location on the image plane.

Mechanical alignment of the SLMs is possible, in a manner similar to the mechanical alignment of CRTs, where each electron gun must be aimed at the same spot on the display screen. However, mechanical alignment is tedious and typically requires a skilled technician.

SUMMARY OF THE INVENTION

A first aspect of the invention is a method of aligning images produced by spatial light modulators (SLMs) of a display system. At least one SLM has an oversized array of pixel elements that is larger than the frame size. A first test image produced by a first SLM is displayed on an image plane. This first test image has at least two spaced test pixels. A second test image produced by a second SLM is simultaneously displayed on the image plane. This second test image has at least two spaced test pixels that should appear at the same locations, respectively, as the test pixels of the first image. If the test pixels do not appear at the same location, the memory cells of the SLM having the oversized array is re-addressed, so that different memory cells receive the data and the test pixels appear at the same location.

Another aspect of the invention is a method of "fine" alignment for aligning SLMs whose pixels are less than one pixel distance out of alignment. This fine alignment can be accomplished in the horizontal direction by delaying the phase of analog-to-digital conversion of an analog RGB signal. Alternatively, fine alignment can be accomplished in the horizontal or vertical direction by digitally filtering RGB data.

A technical advantage of the invention is that it provides a simple means for aligning the images generated by multiple SLMs. There is no need for a specially trained technician—a consumer can display a simple test pattern and align the differently colored images one at a time, using a remote control device.

BRIEF DESCRIPTION OF THE DRAWINGS

FIGS. 1 and 2 are block diagrams of color display systems having three SLMs, each of which provides a differently colored image that is combined to form the image perceived by a viewer.

FIG. 3 illustrates an SLM, including its addressing circuitry.

DETAILED DESCRIPTION OF THE INVENTION

Figure 4:
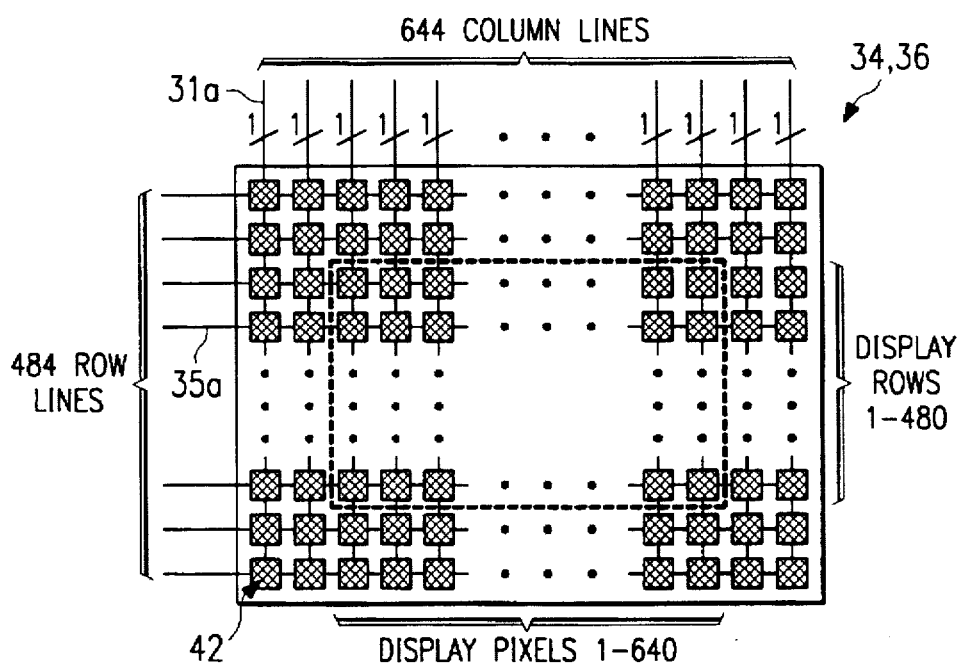
FIG. 4 illustrates the alignment control aspects of the addressing circuitry of an SLM.

A comprehensive description of a DMD-based digital display system is set out in U.S. Pat. No. 5,079,544, entitled "Standard Independent Digitized Video System", in U.S. Pat. Ser. No. 08/147,249 (Atty Dkt No. TI-17855), entitled "Digital Television System", and in U.S. Pat. Ser. No. 08/146,385 (Atty DKt No. TI-17671), entitled "DMD Display System". U.S. Pat. Ser. No. 07/678,761, entitled "DMD Architecture and Timing for Use in a Pulse-Width Modulated Display System" (Attorney Docket No. TI-15721), describes a method of formatting data for use with a DMD-based display system and a method of modulating bit-planes to provide varying pixel brightness. Each of these patents and patent applications is assigned to Texas Instruments Incorporated, and each is incorporated herein by reference. U.S. Pat. No. 5,079,544 describes the general use of a DMD-based display system with three DMDs to provide a color display image.

FIG. 1 is a block diagram of a display system 10 for an SLM-based projection display system, which provides color images from pixel data sampled from a video signal. Although the following description is in terms of a display system 10 that receives a broadcast television signal, it should be understood that display system 10 could be any type of equipment for receiving an image data signal and displaying images represented by the signal. FIG. 2 is a block diagram of a similar system 20, in which the input signal already represents digital data. In both FIGS. 1 and 2, only those components significant to pixel processing are shown. Other components, such as those used for processing synchronization and audio signals, are not shown.

The invention, which involves various aspects of SLMs 16, is useful with either display system 10 or 20. For purposes of example, the description herein is directed to display system 10. In general, the invention is useful for aligning two or more SLMs 16 of any type of display system, whether they be for providing color, stereo vision, or some other purpose.

A display image obtained from an NTSC signal, having 640 pixels per row, 480 rows per frame, and 24 bits per pixel is assumed. This is after a de-interlacing process is performed by processor 14, to convert interlaced fields having 240 odd-rows or even-rows into frames having 480 rows. There are 8 bits of pixel data for each of three colors. Thus, there are 24 bit-planes. The primary effect of different frame and pixel sizes would be differences in the size of the memory arrays and pixel element arrays described herein.

As an overview of display system 10, signal interface unit 11 receives an analog television signal and separates video, synchronization, and audio signals. It delivers the video signal to A/D converter 12a and Y/C separator 12b, which convert the signal into pixel-data samples and perform luminance/chrominance separation. These A/D conversion and Y/C separation tasks could be performed in either order.

Processor system 14 prepares the data for display, by performing various processing tasks. Typical processing tasks are colorspace conversion to RGB (red, green, blue) data, gamma correction, and pixel generation for creating frames from interlaced fields. Processor system 14 includes a field buffer and whatever additional processing memory for storing pixel data during processing is required.

Display memory 15 receives processed pixel data from processing system 14. It formats the data into bit-planes, which it delivers to SLMs 16.

Display system 10 has three SLMs 16, one each for data representing each of three colors. Here, the three colors are red, green, and blue, consistent with colorspace conversion to RGB data. Thus, one SLM 16 receives red data and provides the red portion of the image, one SLM 16 receives green data and provides the green portion of the image, and one SLM 16 receives blue data and provides the blue portion of the image. These images are referred to herein as the red image, green image, and blue image. For a single display image, each SLM 16 delivers its red, green, or blue image to the image plane at the same time, so that the viewer perceives the proper color. Varying values of each pixel's red, blue, or green data permit a range of colors to be displayed.

SLMs 16 may be any type of SLM having individually addressable pixel elements. Although this description is in terms of a DMD-type SLM, other types of SLMs could be substituted into display system 10 and used for the method described herein. For example, SLMs 16 could be LCD-type SLMs. Details of a suitable DMD can be found in U.S. Pat. No. 4,956,619, entitled "Spatial Light Modulator", which is incorporated by reference herein. As explained below in connection with FIG. 3, each pixel element is in electrical communication with a memory cell, which stores the next state of the pixel element so that all pixel elements can be reset simultaneously.

Display unit 17 has the optical components for receiving the image from SLMs 16 and for illuminating an image plane such as a display screen. Specifically, display unit 17 combines the images produced by SLMs 16. If SLMs 16 are properly aligned, the light that falls at a particular location on the image plane is derived from data for the same pixel sample of the input signal. Master timing unit 18 provides various system control functions.

Coarse Alignment

FIG. 3 illustrates a DMD-type SLM 16 in further detail. Each red, green, or blue SLM 16 has the same structure. Timing connections for SLMs 16 are not shown, but the timing is described below and is further described in the patent applications incorporated by reference above.

In operation, a row of data from display memory 15 is delivered to input register 31. Input register 31 is "wider" than the row of data to be displayed as the display image. In other words, the row of data that input register 31 stores has more bits than are displayed as a display row. Input register 31 has a number of column lines 31a, each of which carries one bit of data. Because of a one-to-one correspondence of column lines 31a and columns of pixel elements of array 36, it follows that the length of a row of pixel elements of array 36 is also wider than the length of a display row.

An alignment control unit 32 determines which output taps of register 31 will provide data along the column lines 31a. When the register 31 is full, the row of data is passed to parallel latch 33. After the data is latched, it is passed along column lines 31a to array 36. In an alternative embodiment, alignment control unit 32 could determine which outputs of parallel latch 33 carry data down the column lines 31a, rather than which taps of input register 31.

The row of memory cell array 34 to be written with the row of display data is selected by row selector 35 via a row enable line 35a. The number of rows of pixel elements of array 34 is greater than the number of rows of data to be displayed. As explained below, alignment control unit 32 provides a signal to row selector 35 that determines which rows of array 34 will receive the display rows. Once row selector 35 is initialized by alignment control unit 32, it enables the row enable lines 35a, as input register 31 is filled with new rows of data, until all rows of array 34 have been written with data.

When all rows of memory array 34 are "loaded" in this manner, the pixel elements of array 36 receive a reset voltage. They respond by emitting or reflecting light in accordance with the state of the data in their memory cells. In the case of a DMD, the mirror elements tilt to an on or off position.

FIG. 4 illustrates the addressing circuitry and memory cell array 34 of SLM 16 in further detail. In this embodiment, there is a one-to-one correspondence of memory cells of array 34 and pixel elements of array 36. For this reason, each memory cell/pixel element pair may be referred to as a "pixel element" 42. However, it should be understood that it is actually the memory cell of the pixel element 42 that is being written with data. For simplicity of illustration, only several pixel elements 42 are shown.

In this example, arrays 34 and 36 form a 644×484 array of pixel elements 42. As stated above, the display frame has 480 rows and 640 pixels per row. Thus, SLM 16 has 4 extra pixel elements per row and 4 extra rows of pixel elements. In other words, the array of pixel elements is "oversized" by 4 pixel elements in the horizontal and vertical directions. It should be understood that both the frame size and the number of extra pixels could be varied. In practice, a typical SLM 16 is likely to have many more than 4 extra pixel elements per row and more than 4 extra rows.

Each pixel element 42 in a column is in data communication with a column line 31a so that it may receive data from input register 31. Each pixel element 42 in a row is in data communication with a row enable line 35a so that is either written or not, depending on the state of the row enable line 43. Thus, as each row of data is passed from input register 31 to array 34, the memory cells of a selected row receive the data for that row.

In the example illustrated in FIG. 4, the data for the display frame is centered with respect to the pixel elements 42. However, the location of the display frame with respect to arrays 34 and 36 could be shifted 1-4 pixel elements to the left or right, and 1-4 pixel elements up or down. As stated above, the location of the first row of memory cells to be written with the first display row is determined by alignment control unit 32. Also, the location of the first memory cell of a memory cell row to be written with the first pixel data of a row is determined by alignment control unit 32.

Referring to both FIG. 3 and FIG. 4, alignment control unit 32 receives a vertical alignment signal that indicates which rows of array 34 are to be loaded with display row data. Using the example of FIG. 4, row 3 of array 34 receives display row 1. Alignment control unit 32 also receives a horizontal alignment signal that indicates which memory cells of each row are to be loaded with data. Using the example of FIG. 4, the third memory cell receives the data for the first pixel. So long as the first row and first pixel positions are known, the data for a entire display image can be loaded to the appropriate memory cells. For example, row selector 35 could have a counter that increments 480 times after an initial memory row address is provided by alignment control unit 32. Various implementations of alignment control unit 32 are possible; its primary function is to determine which rows and columns comprise the "active" area of array 36.

Again, it is to be understood that there are three SLMs 16, each having the components of FIGS. 3 and 4. Thus, for example, if SLM 16 is a blue SLM, its alignment control unit 32 receives a vertical alignment signal and a horizontal alignment signal for the blue image. The active area of each SLM 16 (blue, green, and red) can be separately shifted.

In FIGS. 3 and 4, there is a one-to-one correspondence between the cells of array 34 and the pixel elements of array 36. In other embodiments of SLMs 16, two or more pixel elements might share a memory cell. This arrangement is desirable for reducing the memory requirements and hence the cost of an SLM 16. U.S. Pat. Ser. No. 08/002,627 (Atty Dkt No. TI-17333), entitled "Pixel Control Circuitry for Spatial Light Modulator", describes such a system and is incorporated by reference herein. The memory cell receives the data for each of its pixel elements in succession, with only one pixel elements at a time being activated with a reset signal.

As an example of an embodiment of SLM 16 where two or more pixel elements share a memory cell, the sharing pixel elements are in the same column. Thus, for example, the first pixel elements of every four rows might share a memory cell, the second pixel elements of every four rows, etc. In this case, as described above, vertical alignment would involve selecting which rows of memory cells receive the data for the display rows. Horizontal shifting is accomplished in the same manner as with the embodiment of FIGS. 3 and 4. Other variations in shared memory cells are possible, such as horizontally or diagonally sharing pixel elements. The basic concept of the invention described herein is the same, with the desired location of the memory cells to which data is written being controlled by means of their row lines or column lines so that the images from each SLM 16 are aligned.

Figure 5:
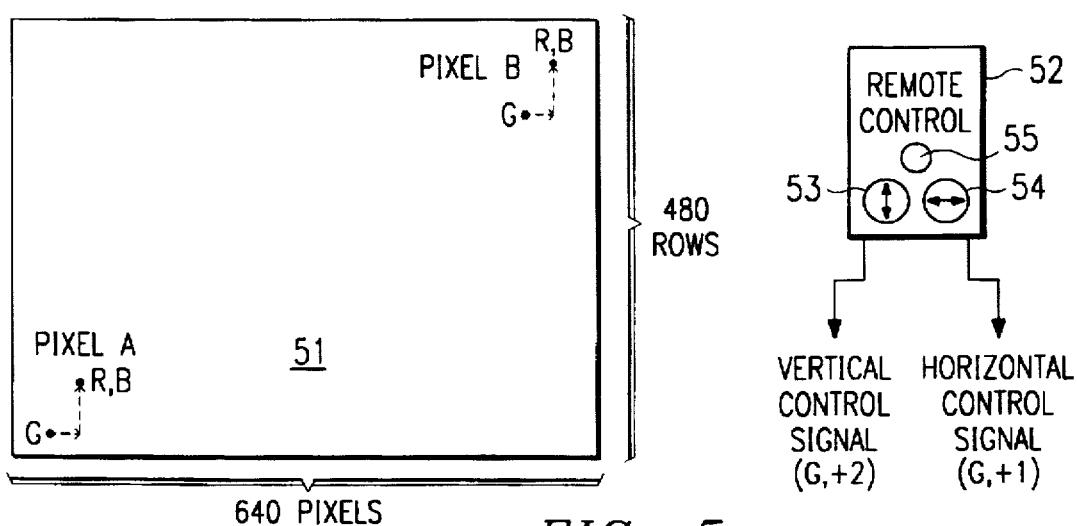
FIG. 5 illustrates a manual method of aligning the images generated by multiple SLMs.

FIG. 5 illustrates a method of aligning SLMs 16s by addressing rows and columns of SLMs 16. It is assumed that SLMs 16 have been positioned so that their images focus in the same plane. Also, the vertical axes of the SLMs 16 are parallel, as are their horizontal axes. In the example of this description, the SLMs 16 provide images of different colors, such as when three SLMs 16 each display RG or B data. However, two or more SLMs 16 could be used to display images with variations other than color, in which case misalignments might be detectable by other than color differences.

The three SLMs 16 are tested for alignment by displaying a test image, comprised of light for each color of two pixels, A and B, on the image plane. Pixels A and B may be spaced anywhere on image plane 51, but preferably are spaced on a diagonal across the image plane 51. If SLMs are properly aligned, the viewer will perceive the two pixels, at A and B, as points of white light. However, in FIG. 5, pixels A and B are not completely aligned. More specifically, the red and blue images are aligned, but the green image does not fall at the desired location. Instead of white light at pixels A and B, the viewer perceives a point of magenta light at pixels A and B and a point of green light elsewhere.

By providing appropriate input to the addressing circuit of the green SLM 16, the viewer can cause the image to be shifted up two pixels and to the right one pixel. This input will result in all three SLMs 16 being aligned. If the addressing circuit of FIGS. 3 and 4 is used, a green horizontal alignment signal will indicate that the rows of memory cells receiving green data are to be shifted +2 (2 rows up), and that the column of memory cells receiving green data are to be shifted +1 (one memory cell to the right).

In the embodiment of FIG. 5, the viewer operates two buttons 53 and 54, on a remote control unit 52. A vertical alignment button 53 permits the viewer to shift the red, green, or blue test image up or down. A horizontal alignment button 54 permits the viewer to shift the red, green, or blue test image left or right. A color select button 55 determines which image is currently being adjusted. The remote control unit 52 delivers appropriate signals to the alignment control unit 32 of the appropriate SLM 16.

In the manner described above, the viewer re-addresses array 34 so as to shift a window of "active" memory cells 42, and hence, active pixel elements, vertically or horizontally.

For a system having three SLMs 16, the second and third SLMs 16 can be aligned to the first by making only four adjustments. Also, if an SLM 16 has one or more defective pixel elements along an edge, the active area can be shifted away from that row or column, and the other SLMs 16 re-aligned accordingly.

Figure 6:
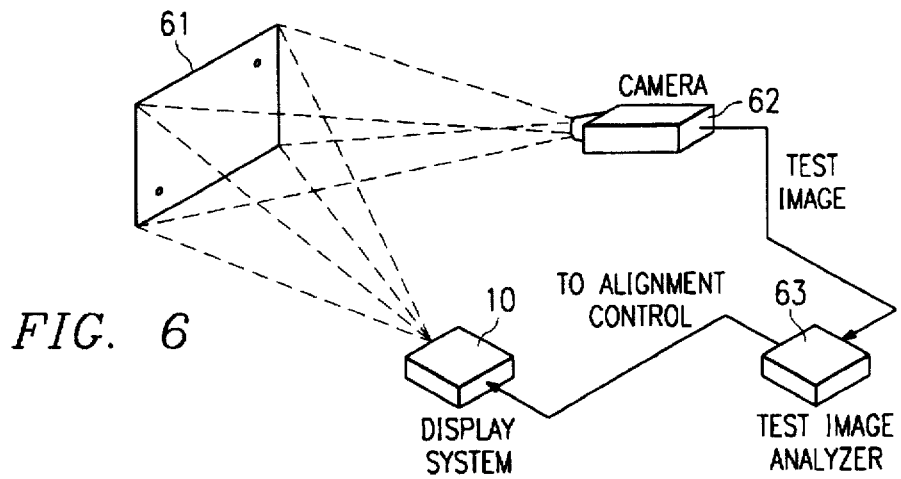
FIG. 6 illustrates an automated method of aligning the images generated by multiple SLMs.

FIG. 6 illustrates an alternative, automated, method of aligning the images generated by multiple SLMs 16. This method is especially suitable for factory alignment of a display system 10 at a final stage of manufacture. A test image, which may be as simple as two spaced points of light, one for each color, is generated by display system 10 to an image plane 61. A camera 62 captures the test image. It delivers the image data to a test image analyzer 63, which determines whether the test points are aligned. If not, the test image analyzer 63 delivers appropriate control signals, vertical or horizontal or both, to alignment control unit 32.

Fine Alignment

The above description is directed to correcting misalignment to within one pixel distance, horizontally or vertically. Another aspect of the invention is directed to correcting misalignment of less than one pixel distance.

Figure 7:
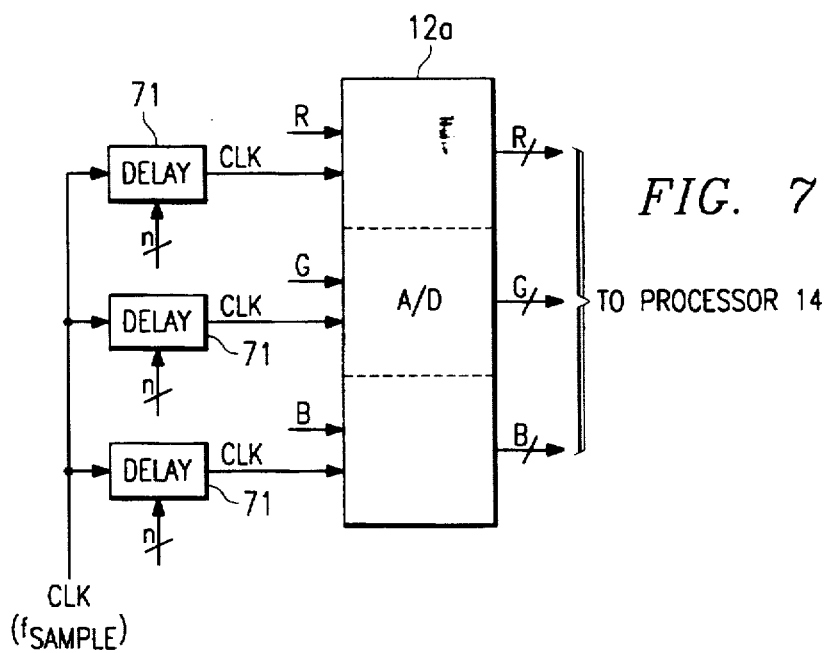
FIG. 7 illustrates a delay unit for an analog RGB signal, which corrects misalignments of less than one pixel distance in the horizontal direction.

FIG. 7 illustrates a method of aligning data in the horizontal direction. It is useful when the incoming data is analog data in the RGB colorspace. It could be easily incorporated into the system of FIG. 1, which in this case, would receive analog RGB data and not include Y/C separator 12b. The signal to A/D converter 12a would be an analog RGB signal, with three data paths, one each for R, G, or, or B data. Processor 14 would perform tasks appropriate for RGB data, such as de-gamma correction or picture control.

The method of FIG. 7 is implemented with programmable delays 71, which are interposed in the clock signal paths before the clock signals reach A/D converter 12a. Each clock signal for the converter for each color has its own delay 71. As in the method of FIGS. 3–6, a misalignment is detected visually by comparing two spaced pixels of at least two different colors on a display screen. If there is a misalignment of one pixel distance or more, the pixels are re-addressed as discussed in connection with FIGS. 3–6. However, if there is a misalignment of less than one pixel distance, an n-bit delay control signal is delivered to delay 71. Depending on the value of the delay control signal, the clock is delayed a certain length of time, less than one sample period. A control device similar to that of FIG. 5 could be used to provide the n-bit data value.

In the example of FIG. 7, the delay control signal is 2 bits. Thus, the delay can be in ¼ increments of the sample period, and the adjustment can be to within ¼ pixel distance of accuracy. Although not shown in FIG. 7, alternatively, the data rather than the clock signal could be delayed.

Figure 8:
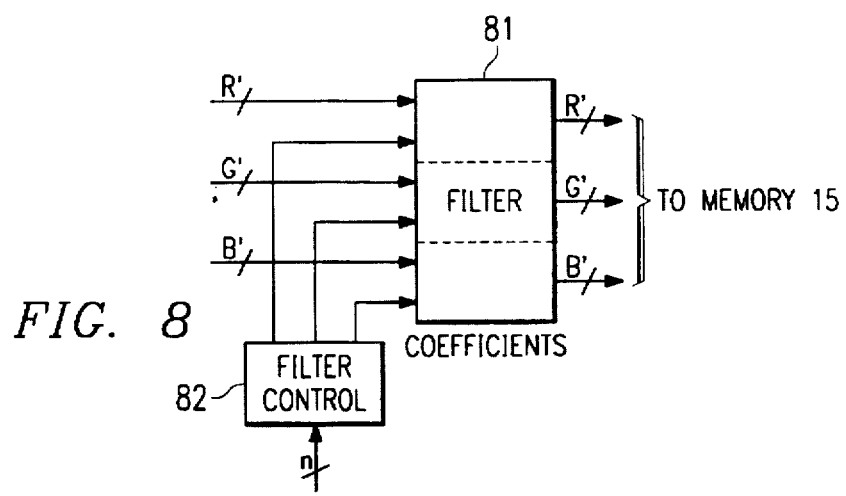
FIG. 8 illustrates a filter for RGB data, which corrects misalignments of less than one pixel distance in the horizontal or vertical direction.

FIG. 8 illustrates a second method of fine adjustment for correcting misalignments of less than one pixel distance. In the method of FIG. 8, RGB data is already in digital form. Thus, the method could be used with the system of FIG. 1 after processing, or it could be used with the system of FIG. 2 anywhere after input of the incoming data.

To implement the method of FIG. 8, a digital filter 81 is interposed in each R, G, or B data path. For horizontal misalignment, filter 81 provides a horizontal delay of less than one sample period. For vertical misalignment, filter 81 provides a vertical delay of less than one line period and includes a line memory. A filter control 82 provides filter coefficients for the data of each RGB color, according to an n-bit input. In either case, the filter transfer function provides unity gain and a programmable phase adjust, for R', G', and B' output data.

Both the method of FIG. 7 and the method of FIG. 8 are easily combined with the method of FIGS. 2–6, so as to provide a method of correcting for both "coarse" and "fine" misalignments. A coarse adjustment as described in connection with FIGS. 3–6 would be followed by a fine adjustment as described in connection with FIG. 7 or FIG. 8.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A spatial light modulator for use in a display system that combines images from multiple spatial light modulators to generate a display image, comprising:

an array of pixel elements, wherein said array has more pixel elements per row than are to be displayed as said display image;

an array of memory cells for storing data representing a voltage to be applied to said pixel elements; an input register operable to receive a display row of data for said display image, and deliver said display row of data for said display image to a selected row of said array of memory cells, said input register having an output tap for delivering data down a column line for each column of said memory cells;

a row decoder for providing a row enable signal to said selected row of said array of memory cells; and an alignment control unit having means for controlling which of said column lines shall deliver said display row to said array of memory cells thereby determining horizontal position of said display row, wherein which of said column lines shall deliver said display row is determined by the comparison between said display image and an image created by at least one other spatially separate SLM.

2. The spatial light modulator of claim 1, wherein said alignment control unit controls said output taps.

3. The spatial light modulator of claim 1, further comprising a parallel latch interposed between said input register and said memory cell array, for storing said display row, each bit position of said parallel latch in data communication with one of said column lines, and wherein said alignment control unit controls the output of said parallel latch.

4. The spatial light modulator of claim 1, wherein said pixel element array has more rows than are to be displayed as said display image, and wherein said alignment control unit further has means for controlling which of said row select lines shall deliver display rows of said display image to said memory cells.

5. A video display system for generating an image from pixel data and having multiple, spatially separate spatial light modulators for generating a combined image on an image plane, comprising:

a processing system for processing said pixel data;

a display memory in data communication with said processing system for storing processing pixel data; and at least two spatially separate spatial light modulators in data communication with said display memory, each having an array of pixel elements, individually addressable, wherein said array has more pixel elements per row than are to be displayed as said display image; an array of memory cells for storing data representing a voltage to be applied to said pixel elements; an input register operable to receive a row of data for said display image, and deliver said row of data to a selected row of said memory cells, said input register having an output tap for each of said pixel elements; a row decoder for providing a row enable signal to said selected row of said array of memory cells; and an alignment control unit having means for controlling which of said output taps of said input register shall deliver said row of data to said array of memory cells thereby determining horizontal position of said display row, wherein which of said output taps is selected based upon a comparison between said display images of said at least two spatially separate spatial light modulators.

6. The display system of claim 5, wherein said system has three of said spatial light modulators, for receiving data representing different colors and for displaying differently colored images.

7. The display system of claim 5, wherein said alignment control unit controls said output taps.

8. The display system of claim 5, wherein said comprising a parallel latch interposed between said input register and said memory cell array, for storing said display row, each bit position of said parallel latch in data communication with one of said column lines, and wherein said alignment control unit controls the output of said parallel latch.

9. The display system claim 5, wherein said pixel element array has more rows than are to be displayed as said display image, and wherein said alignment control unit further has means for controlling which of said row select lines shall deliver display rows of said display image to said memory cells.

10. The video display system of claim 5, wherein said system receives an analog RGB signal, further comprising an analog-to-digital converter for each color of said RGB signal, and a delay unit for delaying the operation of each said analog-to-digital converter.

11. The video display system of claim 5, further comprising a digital filter for delaying RGB data for a time interval of less than one sample period.

12. The video display system of claim 5, further comprising a digital filter for delaying RGB data for a time interval of less than one line period.

* * * * *